Patented Mar. 18, 1947

2,417,513

UNITED STATES PATENT OFFICE 2,417,513

TEXTILE SOFTENING WITH NITROGEN CONTAINING LINEAR ESTER POLYMER

Johannes Nelles, Leverkusen-Schlebusch, Otto Bayer, Leverkusen-I. G. Werk, Wilhelm Tischbein, Leverkusen-Wiesdorf, and Fritz Baehren, Dormagen, Germany; vested in the Attorney General of the United States No Drawing. Application March 6, 1941, Serial No. 382,038. In Germany October 30, 1939

5 Claims. (Cl. 117—139.5)

The present invention relates to new textile assistants and to their application.

Textile materials and articles made therefrom have in most cases to be prepared or treated in order to render them more amenable to textile operations or to impart certain desired properties to them, e. g., a soft touch. According to the particular employment these agents are designated, e. g., as sizing agents, dressing agents, greasing agents, lubricating agents, softening agents and so on. Most of these agents contain radicals of higher fatty acids or radicals of compounds which are derived from these acids as, e. g., the corresponding alcohols, i. e., their basis are the fats.

We have now found that certain new compounds which however do not contain radicals of higher fatty acids or of their derivatives are very well suited for the above-named purposes. These compounds are linear ester polymers containing basic nitrogen. By basic nitrogen is meant nitrogen which is still capable of salt-formation or is present in the quaternary form.

The linear ester polymers are obtainable for instance by condensing aliphatic dicarboxylic acids with dihydric aliphatic alcohols, at least one of the reactants containing basic nitrogen. It is to be understood that the term "aliphatic" is intended to include also cycloaliphatic compounds. The condensation is effected in the usual manner, e. g., by heating the reactants to higher temperatures with elimination of water. Instead of the dihydric alcohols and the dibasic acids as such also their functional derivatives, e. g., the alcoholates and the acid chlorides or anhydrides can be employed. In order to obtain products of particularly good properties for the above-named purposes it is expedient to interrupt the condensation before the condensation products become strongly sticky and ropy, or by suitable selection of the components to effect that the ester polymers chains do not become too long. As suitable starting materials may be mentioned by way of example: succinic acid, adipic acid, methyladipic acid, sebacic acid, 1.4-cyclohexane-diacetic acid, di-(β-hydroxyethyl)-methylamine, N.N'-dihydroxyethyl-ethylene diamine, N-dimethyl-dihydroxypropyl-amine, methyliminodiacetic acid, N.N'-dimethyl-ethylene-diamine diacetic acid, ethylene glycol, 1.4-butylene glycol, glycerol monochlorhydrin.

Further such ester polymers may be prepared and used in which the carbon chain is not only interrupted by ester groups but also by other atoms or groups of atoms, e. g., by —O—, —S—, —CO.NH—, —SO₂.NH—, —NH.CO.NH—. Starting components in this case are, e. g., diglycollic acid, thiodiglycollic acid, diethylene glycol. Condensation products having a break in the chain as indicated can also be prepared, e. g., by jointly employing compounds containing amino-groups such as ethanol amine, 4-hydroxybutylamine-1, α.α-dimethylhydracrylic acid, butyrolactone, ε-aminocaprolactam, hexamethylene diamine, β.β'-diamine-diethyl-ether.

In the preparation of the new polyesters also more than two different starting components may be used. This specific method of working allows one to modify the properties of the resulting condensation products to a much greater extent. Thus, the use of more than two of the starting materials specified above permits of the preparation of condensation products having a relatively low nitrogen content. We wish to point out in this connection that basic nitrogen must be present in our condensation products in order to impart to the same a sufficient affinity towards the fibres. On the other hand, an increase of the nitrogen content is accompanied by a decrease of the fastness to light. Moreover a high nitrogen content may have the undesirable effect of changing the shade of the dyestuffs. Therefore, the preferred species of our invention consists in the application as starting materials of a mixture of a single aliphatic dicarboxylic acid (or a functional derivative thereof) with at least two dihydric alcohols of the character described, basic nitrogen being present in at least one of the latter. Among the dicarboxylic acids the adipic acid is the most preferred one whereas the mixture of aliphatic alcohols preferably consists of a glycol such as 1.4-butylene glycol and a nitrogen containing glycol such as methyl-diethanol amine.

Compounds containing only one reactive group may also be present in the reaction mixture to a certain extent, thus monohydric alcohols (e. g., butyl alcohol, ethylhexanol) or amines (e. g., stearylamine, octylamine, benzylamine, diethylaminoethanol) or monocarboxylic acids. Additions of this kind have a regulating effect upon the course of the condensation, since they cause a break off of the chain and thus prevent the formation of products of too high a molecular weight.

The condensation products thus obtained are as such or in the form of their salts or their quaternary ammonium compounds soluble or emulsifiable in water; besides they are fusible.

The new ester polymers can be applied to the textile materials to be prepared or treated in the same manner as the agents hitherto known; thus they can be applied e. g. to crude cotton staple fibre, to crude artificial silk, to staple fibre therefrom, half-wool, wool silk or to yarns or to articles made therefrom which may also be dyed. The textile materials are treated, e. g., in aqueous liquors which contain the agents in solution or emulsion, or the aqueous solutions or emulsions of the agents are sprayed upon the textile materials. The quantity of the agents to be applied depends upon the desired effect and varies between 0.1 and 20%, calculated on the weight of the textile material. Of course, the new textile assistants may be applied together with other agents, thus, e. g., together with softening agents containing a fatty radical.

*Example 1*

A mixture of 202.1 g. of sebacic acid and 125.1 g. of $\beta.\beta'$-dihydroxyethyl methylamine are heated to 180–200° C. for 3 hours while an oxygen-free nitrogen current is allowed to pass through and the water formed is distilled off. A viscous light yellow oil is obtained.

1 g. of this condensation product is dissolved in 1 liter water, if necessary, on adding a small quantity of acetic acid. Unprepared cuprammonium or viscose artificial silk is treated in this bath at 60–80° C. for 10 minutes, bath ratio 1:20. After hydro-extracting and drying a material of a soft and smooth touch is obtained.

*Example 2*

43.8 parts of pure adipic acid, 14.2 parts of 1.4-butylene glycol and 18.8 parts of $\beta.\beta'$-dihydroxyethyl-methylamine are heated at a downward condenser to 180–200° C. for 4 hours under exclusion of air and while an oxygen-free nitrogen current is allowed to pass through and thereupon at a pressure of 3 mm. to 250° C. for 3 hours. A light viscous oil is obtained which slowly hardens after some time and which is insoluble in diluted solution of sodium carbonate but easily soluble in diluted acetic acid.

Cuprammonium artificial silk still moist from the spinning process is treated at 60–70° C. for 25 minutes in a bath (bath ratio 1:20) which contains 3 g. per liter of the above mentioned condensation product and 1.5 cc. of glacial acetic acid. When dried the artificial silk is soft and smooth and can easily be worked.

*Example 3*

1.14 g. of adipic acid, 225 g. of $\beta.\beta'$-dihydroxyethyl-methylamine and 681 g. of 1.4-butylene glycol are heated to 160° C. at a downward condenser while nitrogen is allowed to pass through. The temperature is raised within 3 hours to 200° C. With elimination of water a light yellow oil is obtained which on cooling changes to a wax-like substance. Yield: about 1870 g.

"Spin dyed" (dyed in the spinning mass) artificial silk is treated at 60–70° C. for 15 minutes in a bath (bath ratio 1:20) which contains 5 g. per liter of the above mentioned product and 2.5 cc. of glacial acetic acid. After hydro-extracting the material is dried at 80–100° C. for about 2 hours and thereupon conditioned. The artificial silk obtained is soft, smooth and does not stick together and can easily be worked.

*Example 4*

87.6 g. of adipic acid, 37.8 g. of 1.4-butylene glycol and 49.2 g. of N-diethyl-$\beta$-hydroxyethylamine are condensed at 180–200° C. for 4 hours. After cooling a viscous oil is obtained which can be emulsified by stirring it into water. The compound is easily soluble in diluted aqueous acetic acid.

Newly spun, damp, squeezed out staple fibre is treated in an acetic acid solution of 10 g. per liter of the above mentioned condensation product (bath ratio 1:20) at 80° C. for 5 minutes, squeezed out and finished as usual. The staple fibre obtained is soft and smooth and can be worked without difficulty, e. g., may be converted into a sliver.

*Example 5*

160.1 g. of $\beta$-methyl adipic acid, 75.7 g. of 1.4-butylene glycol and 49.2 g. of N-diethyl-$\beta$-hydroxyethylamine are condensed at 170–200° C. for 6 hours under exclusion of oxygen and with distilling off the water formed, the temperature being slowly raised from 170 to 200° C. A colorless, oil changing to a salve-like substance is obtained which is easily soluble in diluted acetic acid when heated.

Still moist, hydro-extracted artificial silk is treated at 70–80° C. for 25 minutes in an aqueous solution of 0.3 g. per liter of the above product containing 0.1 g. per liter of glacial acetic acid (bath ratio 1:20), dried and treated in a second bath which contains 5 g. per liter of the above mentioned condensation product and 2 g. per liter of glacial acetic acid, at 60–70° C. for 20 minutes (bath ratio 1:15). After finishing in the usual manner a soft material of good touch is obtained which can be worked without difficulty and dyed.

*Example 6*

A condensation product of 87.6 g. of adipic acid, 28.4 g. of 1.4-butylene glycol, 22.5 g. of $\beta.\beta'$-dihydroxyethylmethylamine and 14.6 g. of 1.6-hexamethylendiamine, prepared according to Example 5, first paragraph, represents a wax-like substance emulsifiable in diluted aqueous acetic acid.

Delustered (in the spinning solution) artificial silk is treated at 40–50° C. for 30 minutes in a bath containing 2.5 g. of the above mentioned product and 2.5 g. of glacial acetic acid per liter (bath ratio 1:20). After squeezing out and drying a soft, smooth material is obtained.

*Example 7*

Staple fibre from cuprammonium artificial silk is treated in the manner stated in Example 4 in a bath containing per liter 5 g. of a condensation product obtained according to D. R. P. 612,686, Example 1, and 5 g. of the product mentioned in Example 4 of the present application and 4 cc. of glacial acetic acid. A loose material of smooth touch is obtained which can easily be converted into carded yarn.

*Example 8*

Artificial silk dyed with substantive dyestuffs is treated at 25–30° C. for 15 minutes in a solution of 1 g. per liter of the condensation product described in Example 3 (bath ratio 1:20), squeezed out, dried and conditioned. A material of soft and supple touch is obtained. When changing the quantity of the agent the smoothness may be changed as it is desired for the working, e. g., the working at the loom.

*Example 9*

438.3 g. of adipic acid, 227 g. of 1.3-butylene glycol and 75 g. of β.β'-dihydroxyethyl-methylamine are condensed at 160–200° C. while an oxygen-free nitrogen current is allowed to pass through, until a test portion of the condensation product is soluble in about 5% of acetic acid. The product obtained represents a yellow-brown viscous oil.

Unprepared skeins of artificial silk are treated at 35–40° C. for 15 minutes in a bath which contains 1 g. of the above mentioned product and 0.5 cc. of formic acid per liter (bath ratio 1:20). After hydro-extracting and drying a loose material of soft and smooth touch is obtained.

Example 10

438 g. of adipic acid, 156 g. of ethylene glycol and 75 g. of β.β'-dihydroxyethyl-methyl-amine are condensed as described in Example 9. An oil is obtained which changes to a wax-like substance and is well suited for the preparation or brightening of cellulosic materials. It may be applied, e. g., in the manner stated in Example 9.

Example 11

1000 g. of condensation product prepared according to Example 3, first paragraph, are melted and added with stirring to a solution of 250 g. of the sodium salt of the alkylated naphthalene sulfonic acid, prepared according to D. R. P. 336,558, in three times the quantity of water. Thereupon 40 cc. of a 25% aqueous ammonia solution are added. After cooling a wax-like substance is obtained.

For the working on the padding machine 6000 g. of the mixtures described are dissolved in 100 liters of water and brought at about 40° C. in one passage on fabrics of regenerated cellulose or mixed fabrics of cellulosic fibres and acetate artificial silk fibres. A material is obtained which has fuller and smoother touch than the untreated material.

We claim:

1. A process of imparting a soft touch to textile materials which comprises incorporating therein a basic nitrogen-containing linear ester polymer obtained by heating to condensation a substance of the group consisting of aliphatic dicarboxylic acids and the functional derivatives thereof with a substance of the class consisting of aliphatic dihydric alcohols and the functional derivatives thereof, the components being selected in such a manner that at least one of the reactants contains basic nitrogen, for a period of time such that the polyester is not strongly sticky and ropy.

2. A process of imparting a soft touch to textile materials which comprises incorporating therein a basic nitrogen-containing linear ester polymer obtained by heating to condensation an aliphatic dicarboxylic acid with a mixture of at least two aliphatic dihydric alcohols, at least one of the alcohols containing basic nitrogen, for a period of time such that the polyester is not strongly sticky and ropy.

3. A process of imparting a soft touch to textile materials which comprises incorporating therein a basic nitrogen-containing linear ester polymer obtained by heating to condensation adipic acid with a mixture of an aliphatic nitrogen-free dihydric alcohol and a basic nitrogen-containing aliphatic dihydric alcohol, for a period of time such that the polyester is not strongly sticky and ropy.

4. The process as defined in claim 3, wherein the nitrogen-free dihydric alcohol is 1.4 butylene glycol.

5. The process as defined in claim 3, wherein the nitrogen-free dihydric alcohol is 1.4 butylene glycol and the other dihydric alcohol is methyl diethanolamine.

JOHANNES NELLES.
OTTO BAYER.
WILHELM TISCHBEIN.
FRITZ BAEHREN.

REFERENCES CITED

The following references are of record in the file of this patent:

UNITED STATES PATENTS

| Number | Name | Date |
| --- | --- | --- |
| 2,067,202 | Pool et al. | Jan. 12, 1937 |
| 2,212,369 | Jaeger | Aug. 20, 1940 |
| 2,295,699 | Thackston | Sept. 15, 1942 |
| 2,190,133 | Epstein | Feb. 13, 1940 |
| 2,191,978 | Balle | Feb. 27, 1940 |
| 2,054,979 | Johrstorfer | Sept. 22, 1936 |
| 2,094,608 | Kritchevsky | Oct. 5, 1937 |
| 2,217,683 | Katzman | Oct. 15, 1940 |
| 2,226,116 | De Grorite | Dec. 24, 1940 |
| 2,233,001 | Dickey | Feb. 25, 1941 |
| 2,234,722 | Dickey | Mar. 11, 1941 |
| 2,047,663 | Barrett | July 14, 1936 |